US008777794B2

(12) United States Patent
Oishi

(10) Patent No.: US 8,777,794 B2
(45) Date of Patent: Jul. 15, 2014

(54) GEARED MOTOR

(71) Applicant: Fuji Kiko Co., Ltd., Kosai (JP)

(72) Inventor: Kunihisa Oishi, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 0 days.

(21) Appl. No.: 13/662,992

(22) Filed: Oct. 29, 2012

(65) Prior Publication Data
US 2013/0109526 A1 May 2, 2013

(30) Foreign Application Priority Data

Oct. 31, 2011 (JP) ................. 2011-239136

(51) Int. Cl.
*F16H 1/32* (2006.01)
(52) U.S. Cl.
USPC ......................................... 475/162
(58) Field of Classification Search
CPC .............. F16H 1/30; F16H 1/32; F16H 37/04
USPC .......................... 475/162, 169, 170
See application file for complete search history.

(56) References Cited

U.S. PATENT DOCUMENTS

| 6,114,820 | A * | 9/2000 | Nishigaya | 318/466 |
| 6,408,573 | B1 * | 6/2002 | Fukumoto et al. | 49/360 |
| 6,530,175 | B2 * | 3/2003 | Sato et al. | 49/138 |
| 6,805,650 | B2 * | 10/2004 | Branov et al. | 475/162 |
| 2004/0254041 | A1 * | 12/2004 | Becker et al. | 475/162 |
| 2005/0119085 | A1 * | 6/2005 | Becker et al. | 475/162 |
| 2006/0046889 | A1 * | 3/2006 | Christensen | 475/170 |
| 2007/0161451 | A1 | 7/2007 | Genter et al. | |
| 2007/0209857 | A1 | 9/2007 | Wolf | |
| 2013/0109526 | A1 * | 5/2013 | Oishi | 475/149 |

FOREIGN PATENT DOCUMENTS

JP 2007-533282 A 11/2007

* cited by examiner

*Primary Examiner* — Edwin A Young
(74) *Attorney, Agent, or Firm* — Foley & Lardner LLP

(57) ABSTRACT

A geared motor including a case body, a case cover cooperating with the case body to form a case, each of the case body and the case cover including at least three mount holes into which bolts are inserted to couple the case to a member to which the geared motor is mounted, the mount holes of the case body and the mount holes of the case cover being formed around cylindrical bores of the case body and the case cover in axial alignment with each other, and generally cylindrical collars inserted into and extending over the mount holes of the case body and the mount holes of the case cover which are axially aligned with each other.

5 Claims, 7 Drawing Sheets

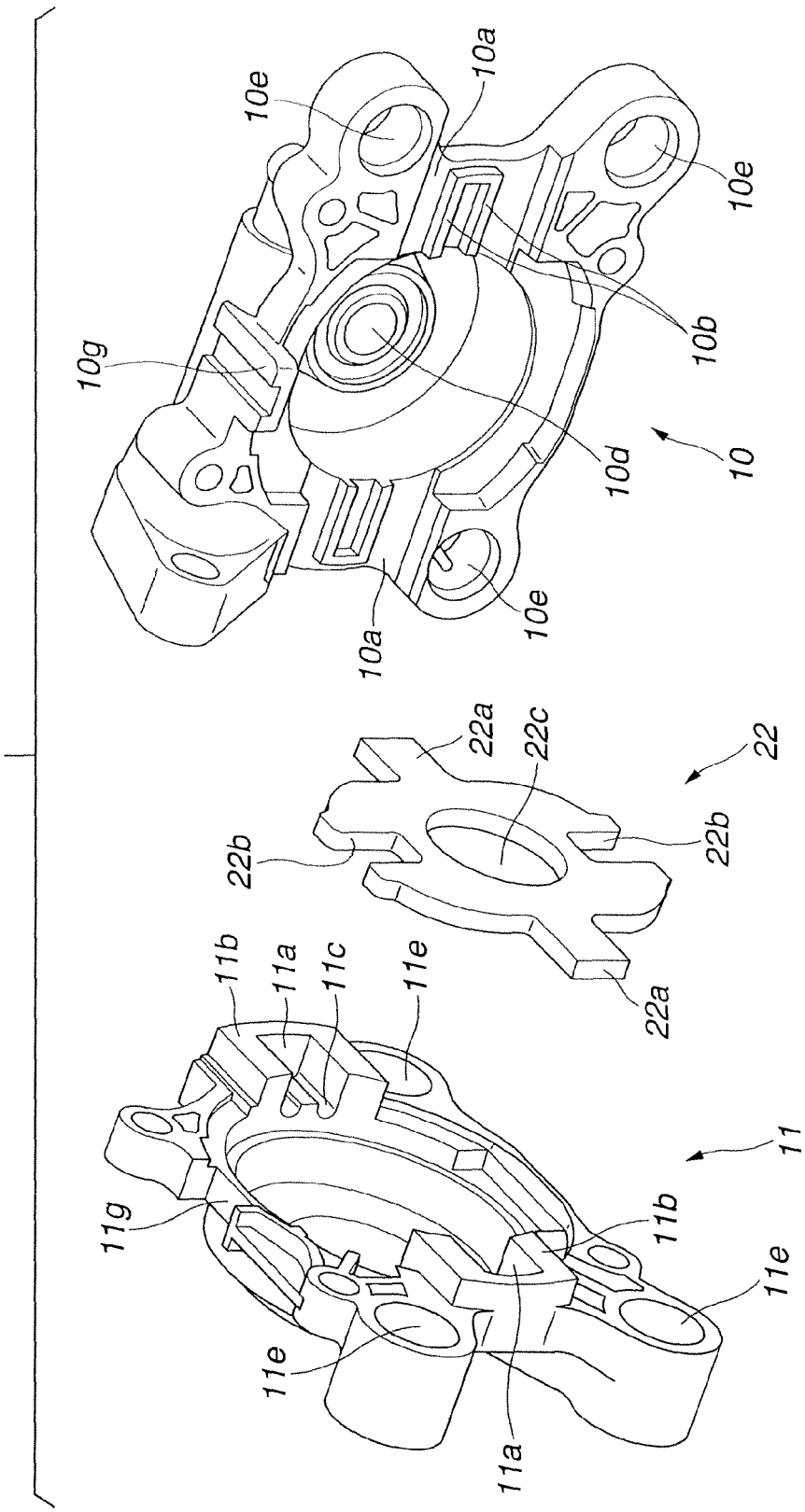

GEARED MOTOR

BACKGROUND OF THE INVENTION

The present invention relates to a geared motor having a hypocycloid-type speed reducer and a case made of a resin material.

For example, a geared motor that is an electric motor with a speed reducer is used as a driving source for a seat lifter for an automobile.

Japanese Patent Application Unexamined Publication No. 2007-533282 A based on PCT Application No. PCT/EP2005/003716 discloses an actuator including a worm provided on an output shaft of a drive motor, a spur wheel meshing with the worm, and an eccentric bearing pin formed integrally with the spur wheel and having an axis offset from an axis of the spur wheel. The eccentric bearing pin is engaged in a bearing opening of a wobble plate. The wobble plate has a swivel arm clearance-fitted into a radial groove of an intermediate plate. When the spur wheel is rotated through the worm, the wobble plate and a gear formed integrally with the wobble plate are turned around an axis of the spur wheel without being rotated about the axis. The gear of the wobble plate is turned around the axis of the spur wheel while meshing with an internal teeth of a driven wheel. Therefore, when the gear is turned around the axis of the spur wheel one time, the intermeshing portion of the gear and the internal teeth is moved to make one-time turn so that the driven wheel is caused to rotate by a difference between the number of teeth of the gear and the number of teeth of the internal teeth. As a result, the rotation number of the driven wheel is reduced relative to the rotation number of the spur gear.

U.S. Patent Application Publication No. 2007/0161451 A1 discloses a geared motor including a worm provided on an output shaft of an electric motor, a worm gear meshing with the worm, an eccentric hollow shaft rotatably connected with the worm gear, and an eccentric gear mounted on the eccentric hollow shaft so as to be capable of turning around the eccentric element while meshing with an internal teeth of an output element. When the worm gear is rotated to cause the eccentric gear to turn around the eccentric hollow shaft, the intermeshing portion of the eccentric gear and the internal teeth of the output element is moved to make one-time turn so that the output element is caused to rotate by a difference between the number of teeth of the internal teeth of the output element and the number of teeth of the eccentric gear. As a result, the rotation number of the output element is reduced relative to the rotation number of the worm gear. The eccentric gear is prevented from rotating by a coupling element.

SUMMARY OF THE INVENTION

However, in the actuator of the above-described former conventional art, in a case where a large external force is inputted to the gear of the wobble plate through the driven wheel (i.e., an output side), a rotational force acts on the gear of the wobble plate through the driven wheel, and the rotational force is transmitted to the intermediate plate through the gear and the swivel arm of the wobble plate. For this reason, the intermediate plate is directly fixed to a frame of a vehicular seat. On the other hand, in the geared motor of the above-described latter conventional art, a rotational force acts on the output element, and the rotational force is transmitted from the output element to the eccentric gear, and then to the coupling element through a convex portion of the eccentric gear. For this reason, the coupling element is directly fixed to a frame of a vehicular seat.

In both of the conventional arts, the intermediate plate and the coupling element are formed of a steel plate having a large strength. Therefore, as compared with the case where the intermediate plate and the coupling element are formed of a resin material, the weight and the number of parts used in these conventional arts are increased to thereby cause increase in cost.

It is an object of the present invention to provide a geared motor capable of solving the above-described problem.

In a first aspect of the present invention, there is provided a geared motor including:
a case body made of a resin material, the case body having a cylindrical bore extends through the case body;
a case cover made of a resin material, the case cover having a cylindrical bore extends through the case cover, the case cover cooperating with the case body to form a case,
an output shaft rotatably supported by the case body and the case cover through the cylindrical bores, the output shaft having at least one axial end portion outwardly projecting from the case,
an electric motor mounted to the case body;
a worm connected to the electric motor;
a worm gear meshing with the worm and rotatably supported on a side of the other axial end portion of the output shaft;
an eccentric shaft portion having a central axis eccentric with respect to a central axis of the output shaft, the eccentric shaft portion being formed integrally with the worm gear,
a geared plate having an external gear rotatably supported on the eccentric shaft portion, the external gear being disposed coaxially with the eccentric shaft and formed integrally with the geared plate,
an internal gear formed integrally with the output shaft, the internal gear having the number of teeth larger than that of the external gear and meshing with the external gear,
a generally disk-shaped guide plate disposed between the geared plate and the worm gear, the guide plate guiding the geared plate such that a central axis of the geared plate is allowed to turn around the central axis of the output shaft and the geared plate is prevented from rotating about the central axis of the geared plate,
a pair of first recessed guide portions formed on a surface of one of the case body and the case cover which is opposed to a surface of the other of the case body and the case cover, the pair of first recessed guide portions being diametrically opposed to each other with respect to the cylindrical bore of the one of the case body and the case cover, the pair of first recessed guide portions serving to guide the guide plate so as to be slidable relative to the pair of first recessed guide portions in a radial direction of the output shaft,
a pair of first projecting guide portions formed on the guide plate, the pair of first projecting guide portions being slidably engaged in the pair of first recessed guide portions,
a pair of second recessed guide portions formed on the guide plate along a radial direction of the guide plate, the pair of second recessed guide portions being located offset relative to the pair of first projecting guide portions in a circumferential direction of the guide plate by an angle of 90 degrees,
a pair of second projecting guide portions formed on the geared plate, the second projecting guide portions being slidably engaged in the pair of second recessed guide portions,
a pair of convex fit portions formed on the surface of the one of the case body and the case cover, the pair of convex fit portions being diametrically opposed to each other with respect to the cylindrical bore of the one of the case body and the case cover, the pair of convex fit portions extending along a radial direction of the cylindrical bore of the one of the case body and the case cover, each of the pair of first recessed guide portions being a recessed portion located in a central position of each of the pair of convex fit portions in a circumferential direction of the one of the case body and the case cover, a pair of concave fit portions formed on the surface of the other of the case body and the case cover, the pair of concave fit portions being fitted to the pair of convex fit portions, each of the case body and the case cover being formed with at least three mount holes for receiving bolts to couple the case to a member to which the geared motor is mounted, the mount holes of the case body and the mount holes of the case cover being located around the cylindrical bores thereof in axial alignment with each other, and generally cylindrical collars inserted into and extending over the mount holes of the case body and the mount holes of the case cover which are axially aligned with each other.

In a second aspect of the present invention, there is provided the geared motor according to the first aspect, wherein at least one pair of the mount holes of the case body and the case cover which are axially aligned with each other, are located adjacent to a fitting portion at which one of the pair of the concave fit portions and one of the pair of the convex fit portions are fitted to each other, on an advance side of the fitting portion in a predetermined direction in which the guide plate is rotated when an external load is exerted on the guide plate through the output shaft, the internal gear and the external gear.

In a third aspect of the present invention, there is provided the geared motor according to the first aspect, wherein each of the collars is clearance-fitted into each of the mount holes of the one of the case body and the case cover which is formed with the pair of convex fit portions, on a side of one axial end thereof, and each of the collars is press-fitted to each of the mount holes of the other of the case body and the case cover on a side of the other axial end thereof.

In the geared motor of the present invention, an external load reversely inputted through an output shaft is shared by a case body and a case cover, and the shared loads are independently transmitted to a member to which the geared motor is mounted, through collars and bolts. Therefore, a strength of the case body and the case cover each being formed of resin materials can be ensured regardless of the resin materials. Accordingly, it is not necessary to use a steel plate as a guide plate which is directly fixed to a member to which the geared motor is mounted, as used in the convention art. As a result, the number of parts can be reduced, thereby serving for reduction of weight and cost of the geared motor.

Further, in the geared motor of the present invention, the external load reversely inputted through the output shaft is transmitted to the fitting portion of the case body and the case cover, and then transmitted to the member to which the geared motor is mounted, through the collars and the bolts which are located adjacent to the fitting portion on an advance side of the fitting portion in the predetermined direction. Therefore, only a less amount of the external load is transmitted to the remaining portion of the case body and the case cover except for a portion thereof disposed between the fitting portion of the case body and the case cover and the mount holes for the collars and the bolts which are formed adjacent to the fitting portion on the advance side of the fitting portion in the predetermined direction. As a result, the strength of the case body and the case cover can be ensured.

Further, in the geared motor of the present invention, the collars are clearance-fitted to one of the case body and the case cover which has the convex fit portion to which the external load is directly transmitted. With this construction, the external load transmitted from the first guide projecting portions of the guide plate to the convex fit portion acts on the convex fit portion and the concave fit portion from an initial stage. Accordingly, the external load can be surely transmitted to a member to which the geared motor is mounted, through both the case body and the case cover. That is, the external load is shared by the case body and the case cover in a good balance, and transmitted to the member to which the geared motor is mounted. Since the external load is not intensively transmitted to one of the case body and the case cover, it is possible to enhance a strength of the case.

The other objects and features of this invention will become understood from the following description with reference to the accompanying drawings.

BRIEF DESCRIPTION OF THE DRAWINGS

FIG. 5 is a perspective view of the geared motor according to the embodiment of the present invention, showing a relationship between a guide plate, a case body and a case cover.

DETAILED DESCRIPTION OF THE INVENTION

Figure 1:
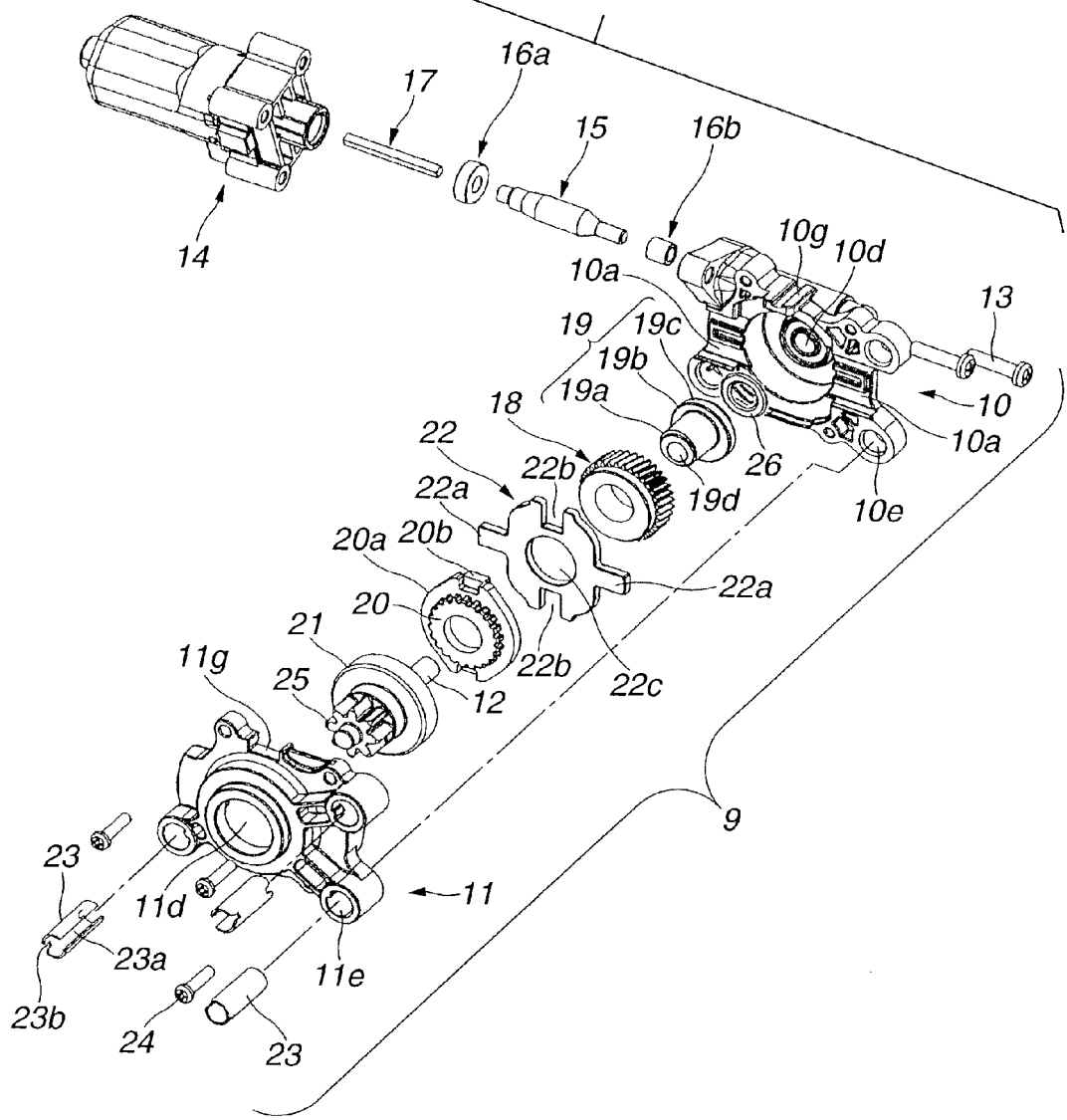
FIG. 1 is an exploded perspective view of a geared motor according to an embodiment of the present invention.

A geared motor according to an embodiment of the present invention is explained hereinafter with reference to the accompanying drawings. For ease of understanding, directional terms, such as "upper", "upward", "lower", "downward", etc. are used in the following description, but merely denote directions as viewed in the drawings.

[Construction]

Figure 7:
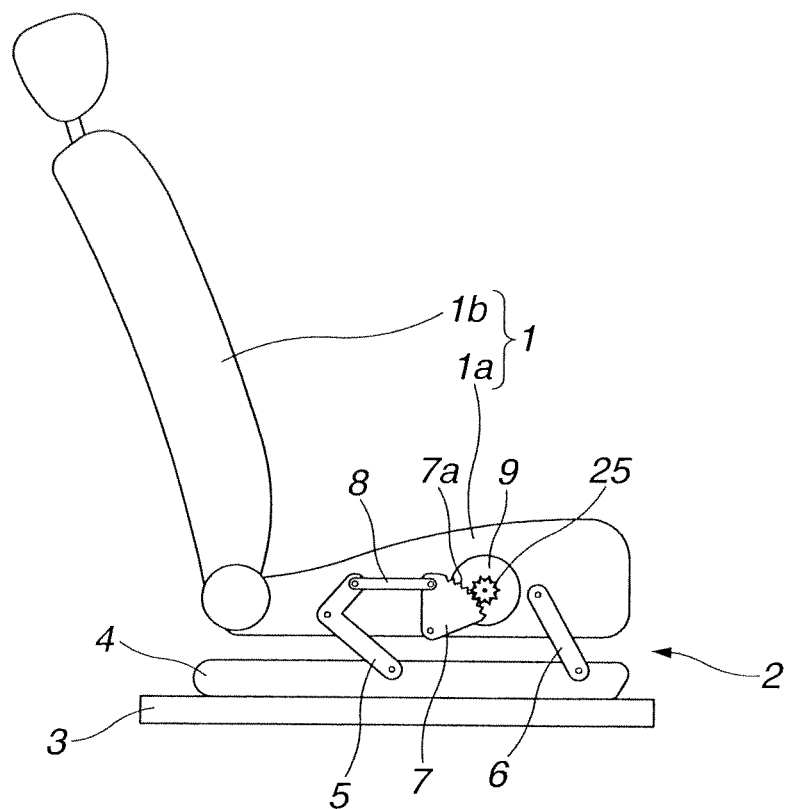
FIG. 7 is a schematic diagram showing a seat lifter to which the geared motor according to the embodiment of the present invention is applied.

First, a seat lifter to which the geared motor according to an embodiment of the present invention is applied, is briefly explained by referring to FIG. 7. As shown in FIG. 7, a seat 1 including a seat cushion 1a and a seat back 1b is provided with the seat lifter 2 which serves to adjust a height of the seat cushion 1a. The seat lifter 2 includes a lower rail 3, an upper rail 4 slidably disposed on the lower rail 3, and links 5, 6 each having lower end portions rotatably connected to the upper rail 4 and upper end portions rotatably connected to the seat cushion 1a. A sector gear 7 is rotatably supported on the seat cushion 1a. The sector gear 7 is connected with an extension extending from an upper portion of the link 5 so as to form an L-shape, through a connecting link 8. Teeth 7a formed on an arcuate portion of the sector gear 7 mesh with a pinion 25 of an output shaft of the geared motor 9 as explained later.

Next, a construction of the geared motor 9 is explained.

As shown in FIG. 1, the geared motor 9 includes a case body 10 and a case cover 11 which cooperate with each other to form a case. The case body 10 includes a cylindrical bore 10d extending through the case body 10. Similarly, the case cover 11 includes a cylindrical bore 11d extending through the case cover 11. The cylindrical bore 10d and the cylindrical bore 11d are disposed axially with each other. The cylindrical bore 10d and the cylindrical bore 11d are formed in axial alignment with the output shaft 12, and serve as shaft support bores through which the output shaft 12 is rotatably supported by the case body 10 and the case cover 11. The output shaft 12 has one axial end projecting from the case cover 11, on which the pinion 25 is disposed.

An electric motor 14 is fixedly mounted to the case body 10 using two bolts 13. The bolts 13 are inserted into two mount holes among four mount holes of the electric motor 14 which are formed in a diagonally opposed relation to each other in a generally rectangular mount portion of the electric motor 14, and two mount holes of the case body 10 which are formed corresponding to the two mount holes of the electric motor 14. A worm 15 is connected to a rotational shaft of the electric motor 14. Specifically, the worm 15 is rotatably supported on the case body through bearings 16a, 16b. One axial end portion of the worm 15 and the rotational shaft of the electric motor 14 are connected to each other through a shaft member 17. The shaft member 17 is fitted into fit holes (not shown) which extend through central portions of the one axial end portion of the worm 15 and the rotational shaft of the electric motor 14 and are axially aligned with each other.

Figure 3B:
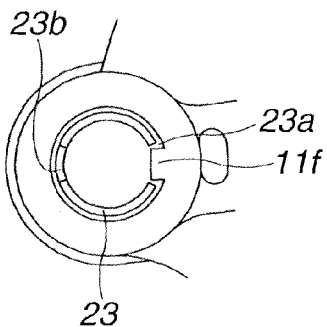
FIG. 3B is a partial front view of the geared motor according to the embodiment of the present invention when viewed from a direction of arrows C as shown in FIG. 3A.
Figure 3D:
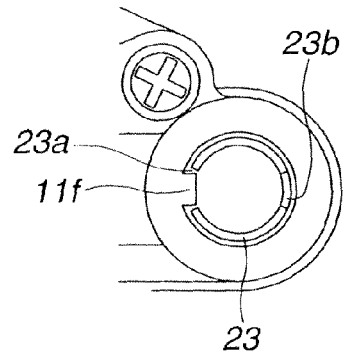
FIG. 3D is a partial front view of the geared motor according to the embodiment of the present invention when viewed from a direction of arrows E as shown in FIG. 3A.
Figure 3A:
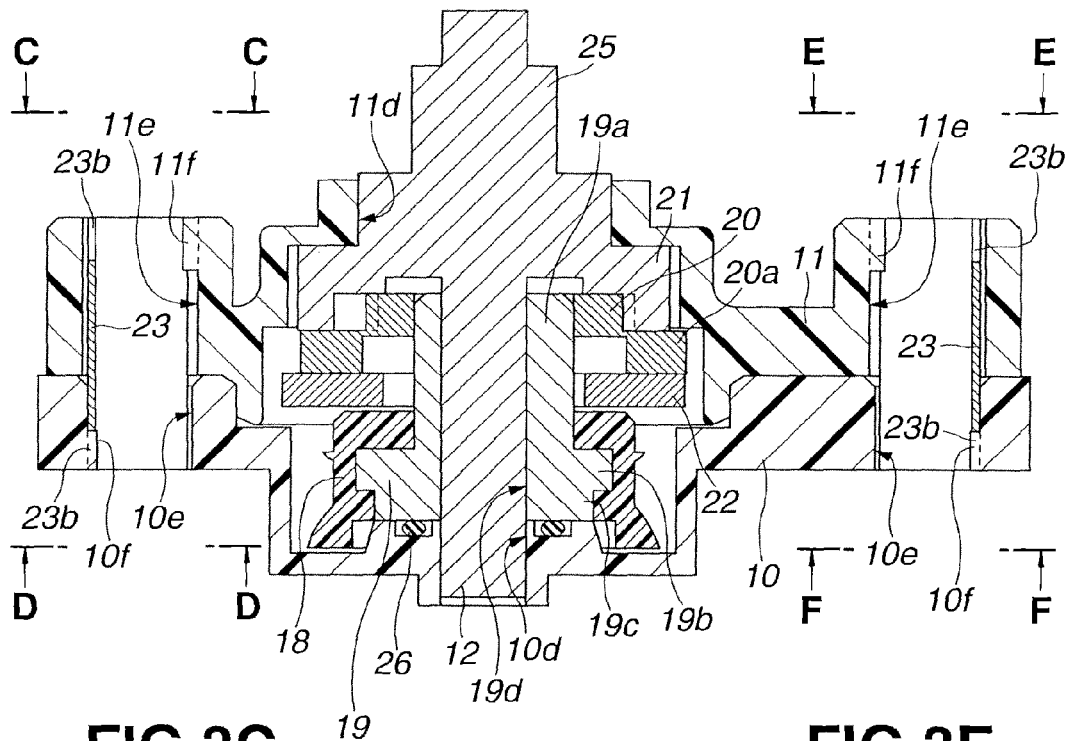
FIG. 3A is a cross-sectional view of the geared motor according to the embodiment of the present invention, taken along line A-A shown in FIG. 2.
Figure 3C:
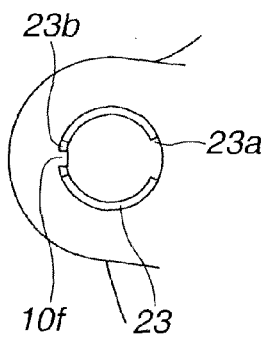
FIG. 3C is a partial rear view of the geared motor according to the embodiment of the present invention when viewed from a direction of arrows D as shown in FIG. 3A.
Figure 3E:
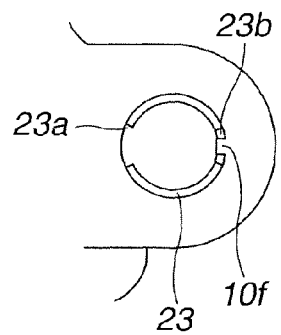
FIG. 3E is a partial rear view of the geared motor according to the embodiment of the present invention when viewed from a direction of arrows F as shown in FIG. 3A.

A worm gear 18 is rotatably supported on the side of the other axial end portion of the output shaft 12, and meshes with the worm 15. The worm gear 18 is coupled to an eccentric member 19 to form an integral part. Specifically, the eccentric member 19 made of a metal material is rotatably disposed on the other axial end portion of the output shaft 12. As shown in FIG. 3A, the eccentric member 19 has an insertion hole 19d into which the output shaft 12 is inserted. The insertion hole 19d is formed in coaxial relation to the output shaft 12. The eccentric member 19 includes a large-diameter portion 19b and an intermediate-diameter portion 19c which are formed in coaxial relation to the insertion hole 19d. The eccentric member 19 also includes an eccentric shaft portion 19a that is connected to the large-diameter portion 19b and eccentric with respect to a central axis of the insertion hole 19d (i.e., a central axis of the output shaft 12). The worm gear 18 made of a resin material is molded on the large-diameter portion 19b, the intermediate-diameter portion 19c and a part of the eccentric shaft portion 19a. The remaining part of the eccentric shaft portion 19a is inserted into a central hole of an external gear 20 which is formed coaxially with the eccentric shaft portion 19a. The external gear 20 is rotatably supported on the eccentric shaft portion 19a. The external gear 20 is formed integrally with a generally annular-shaped geared plate 20a by half blanking. The geared plate 20a has a central hole formed in coaxial relation to the central hole of the external gear 20. With this construction, when the worm gear 18 is rotated on the output shaft 12, the external gear 20 is turned around the central axis of the output shaft 12. That is, a central axis of the external gear 20 draws a circle having a center aligned with the central axis of the output shaft 12 and a radius that extends between a central axis of the eccentric shaft portion 19a and the central axis of the output shaft 12.

The output shaft 12 has an internal gear 21 formed integrally with the output shaft 12. The internal gear 21 has the number of teeth that is larger than the number of teeth of the external gear 20 by one or two. The internal gear 21 and the external gear 20 mesh with each other in a circumferential position thereof to form an intermeshing portion. Since the eccentric shaft portion 19a is turned around the central axis of the output shaft 12, the intermeshing portion is displaced in a circumferential direction of the internal gear 21 and the external gear 20 as the worm gear 18 is rotated.

A guide plate 22 is disposed between the geared plate 20a and the worm gear 18. The guide plate 22 serves to guide the external gear 20 such that the external gear 20 can turn around the central axis of the output shaft 12 and cannot rotate about the central axis of the external gear 20 in a plane perpendicular to the central axis of the output shaft 12. That is, the guide plate 22 serves to guide the geared plate 20a such that a central axis of the geared plate 20a is allowed to turn around the central axis of the output shaft 12 and the geared plate 20a is prevented from rotating about the central axis of the geared plate 20a in the plane perpendicular to the central axis of the output shaft 12. The guide plate 22, the case body 10, and the case cover 11 have the following relationship therebetween. As shown in FIG. 5, the case cover 11 has a pair of first recessed guide portions 11a, 11a on a surface (i.e., a rear surface) opposed to a surface (i.e., a front surface) of the case body 10. The first recessed guide portions 11a, 11a are located diametrically opposed to each other with respect to the cylindrical bore 11d, and extend in a radial direction of the cylindrical bore 11d. The guide plate 22 has a generally disk shape with a central hole 22c. The central hole 22 has such a diameter as to allow the eccentric shaft portion 19a to turn around the output shaft 12 therein. A pair of first projecting guide portions 22a, 22a outwardly project from an outer periphery of the guide plate 22 in a radial direction of the guide plate 22. The first projecting guide portions 22a, 22a are formed in a diametrically opposed relation to each other. The first projecting guide portions 22a, 22a are engaged in the first recessed guide portions 11a, 11a so as to be slidable along the radial direction of the cylindrical bore 11d. A pair of second recessed guide portions 22b, 22b are also formed in a diametrically opposed relation to each other and located offset by an angle of 90 degrees with respect to the first projecting guide portions 22a, 22a in a circumferential direction of the guide plate 22. The second recessed guide portions 22b, 22b are inwardly recessed from the outer periphery of the guide plate 22 in the radial direction of the guide plate 22. Slidably engaged in the second recessed guide portions 22b, 22b in the radial direction of the guide plate 22 are a pair of second projecting guide portions 20b, 20b formed on an outer periphery of the geared plate 20a as shown in FIG. 1. The second projecting guide portions 20b, 20b are diametrically opposed to each other and project toward the guide plate 22 (i.e., rearward) in an axial direction of the geared plate 20a. With this construction, the guide plate 22 can be moved relative to the case cover 11 leftward and rightward in FIG. 1, and the geared plate 20a can be moved relative to the guide plate 22 upward and downward in FIG. 1. As a result, the external gear 20 formed integrally with the geared plate 20a is allowed to turn around the central axis of the output shaft 12, and is prevented from rotating about the central axis of the external gear 20 in the plane perpendicular to the central axis of the output shaft 12.

Figure 4:
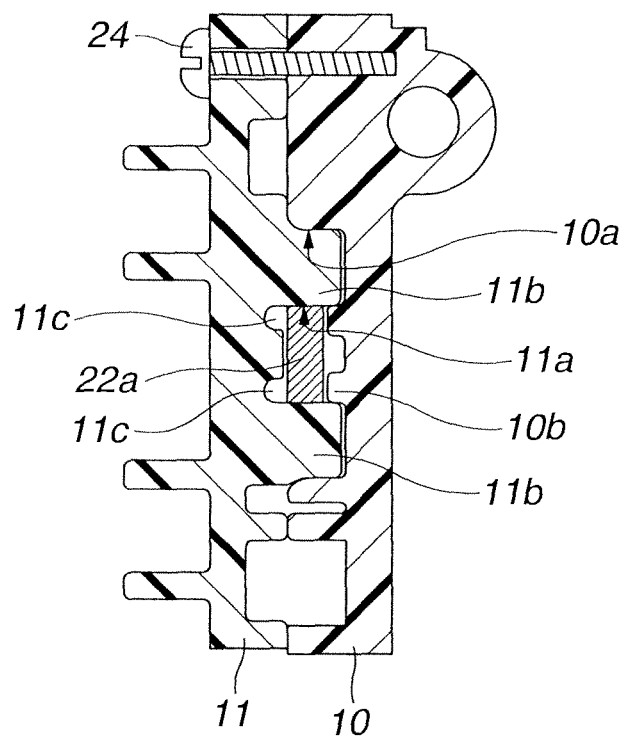
FIG. 4 is a cross-sectional view of the geared motor according to the embodiment of the present invention, taken along line B-B shown in FIG. 2.

As shown in FIG. 5, the case cover 11 also has a pair of convex fit portions 11b, 11b on the surface opposed to the surface of the case body 10. The convex fit portions 11b, 11b are located diametrically opposed to each other with respect to the cylindrical bore 11d, and extend along the radial direction of the cylindrical bore 11d. The convex fit portions 11b, 11b have a generally U-shape in a plan view so as to surround the first recessed guide portions 11a, 11a. On the other hand, the case body 10 has a pair of concave fit portions 10a, 10a on the surface opposed to the surface of the case cover 11. The concave fit portions 10a, 10a outwardly extend in the radial direction of the cylindrical bore 10d of the case body 10. The convex fit portions 11b, 11b are fitted into the concave fit portions 10a, 10a so that a rotational force can be transmitted between the case body 10 and the case cover 11. As shown in FIG. 4, the case cover 11 also has grooves 11c, 11c on a bottom surface of each of the first recessed guide portions 11a, 11a in which the first projecting guide portions 22a, 22a of the guide plate 22 are engaged. The grooves 11c, 11c are formed on peripheral edges of the bottom surface which are opposed to each other in the circumferential direction of the cylindrical bore 11d (i.e., upper and lower edges of the bottom surface). Each of the grooves 11c, 11c is defined by an arcuate surface in section as shown in FIG. 4, and serves to prevent concentration of stress on corner portions of the first recessed guide portions 11a, 11a at which the bottom surface and the upper and lower side surfaces encounter with each other. On the other hand, the case body 10 has a pair of projections 10b, 10b formed on bottom surfaces of the concave fit portions 10a, 10a. Each of the projections 10b, 10b is located in a central position of the bottom surface of each of the concave fit portions 10a, 10a in the circumferential direction of the cylindrical bore 10d. The projections 10b, 10b are engaged in the first recessed guide portions 11a, 11a of the case cover 11 such that the first projecting guide portions 22a, 22a of the guide plate 22 are disposed between the projections 10b, 10b and the bottom surfaces of the first recessed guide portions 11a, 11a. The projections 10b, 10b have a generally U-shape as shown in FIG. 5.

Each of the first recessed guide portions 11a, 11a is a recessed portion formed in a central position of each of the convex fit portions 11b, 11b which extends in a circumferential direction of the case cover 11 (i.e., along a circumferential direction of the cylindrical bore 11d).

Figure 6A:
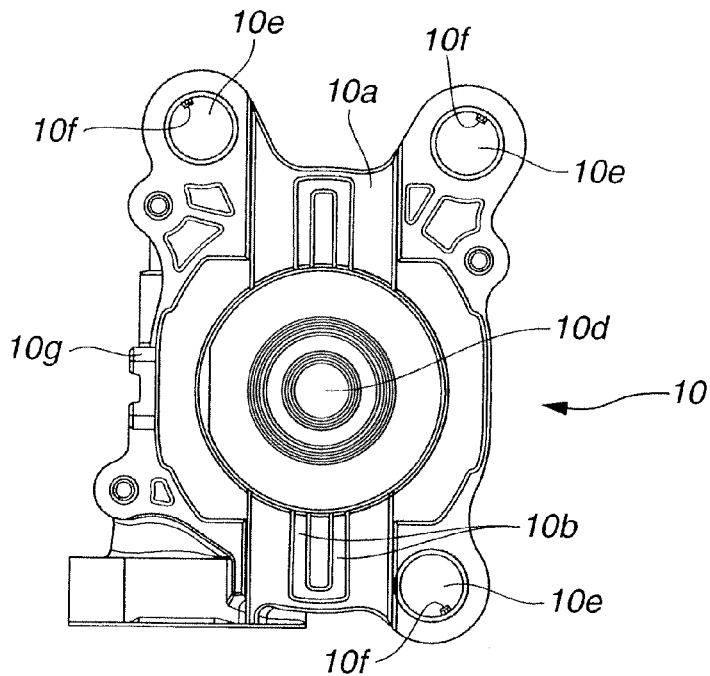
FIG. 6A is a front view of the case body, showing an inside surface opposed to the case cover.
Figure 6B:
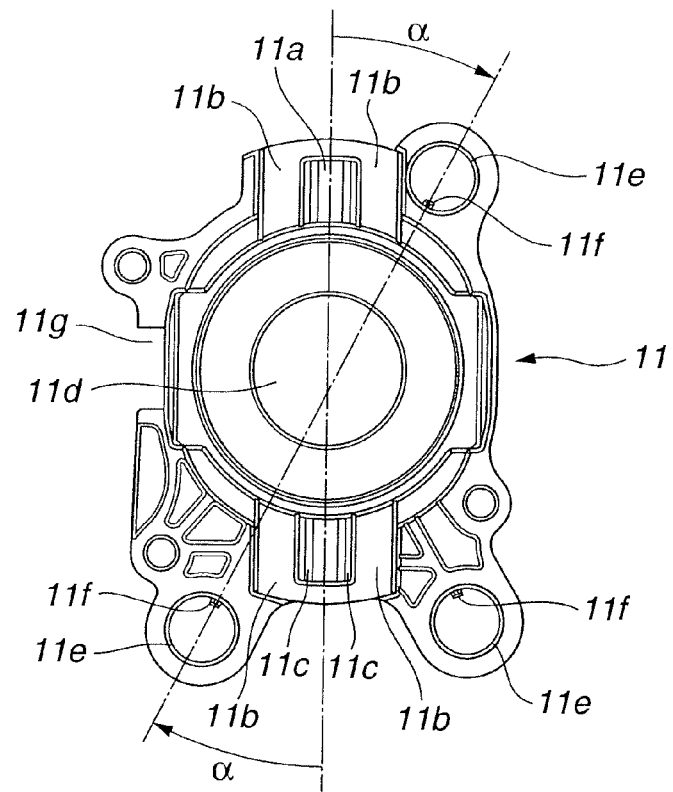
FIG. 6B is a rear view of the case cover, showing an inside surface opposed to the case body.

The case body 10 has three mount holes 10e formed around the cylindrical bore 10d (i.e., around the output shaft 12). The case cover 11 has three mount holes 11e formed around the cylindrical bore 11d (i.e., around the output shaft 12) in axial alignment with the three mount holes 10e. Bolts (not shown) are inserted into the mount holes 10e, 11e in order to connect the case to a seat cushion-side arm (not shown) provided on the seat cushion 1a. At least one pair of the mount holes 10e, 11e among the three pairs of mount holes 10e, 11e of the case body 10 and the case cover 11 which are axially aligned with each other, are located adjacent to a fitting portion at which one of the concave fit portions 10a, 10a and one of the convex fit portions 11b, 11b are fitted to each other, on the advance side of the fitting portion in a predetermined direction in which the guide plate 22 is rotated when an external load is exerted on the case cover 11 in the circumferential direction of the case cover 11. The term "external load" as used herein means a rotational force that is generated so as to rotate the output shaft 12 due to an impact applied to the pinion 25 through the sector gear 7 when a passenger is pressed onto the seat back 1b upon occurrence of vehicle collision. Specifically, the positions of the pair of the mount holes 10e, 11e may be determined so as to minimize adverse influence of the external load on a strength of the case cover 11 and the case body 10. It is preferred that the at least one pair of the mount holes 10e, 11e are suitably located adjacent to the fitting portion on a circumference of a circle having a diameter that is substantially equal to a distance between radial-outer ends of the diametrically opposed concave fit portions 10a, 10a (i.e., a distance between radial-outer ends of the diametrically opposed convex fit portions 11b, 11b). In this embodiment, as shown in FIG. 6B, the two mount holes 11e, 11e diametrically opposed to each other are located adjacent to the convex fit portions 11b, 11b in angular positions offset relative to the convex fit portions 11b, 11b in a clockwise direction by angle α. Similarly, the two mount holes 10e, 10e axially aligned with the diametrically opposed two mount holes 11e, 11e are also located adjacent to the concave fit portions 10a, 10a in angular positions offset relative to the concave fit portions 10a, 10a in the clockwise direction corresponding to the angular positions of the diametrically opposed two mount holes 11e, 11e.

As shown in FIG. 1 and FIG. 3A-3E, a generally cylindrical collar 23 is inserted into the mount holes 10e of the case body 10 and the mount holes 11e of the case cover 11 which are axially aligned with each other. The collar 23 extends over both the mount holes 10e and the mount holes 11e. As shown in FIG. 3A-3E, the collar 23 has substantially the same axial length as that of a total axial length of the axially aligned mount holes 10e, 11e. The collar 23 is press-fitted into the mount holes 10e of the case body 10, but is clearance-fitted into the mount holes 11e of the case cover 11. With this construction, when an external load is applied from the guide plate 22 to both the case cover 11 through the convex fit portions 11b, 11b engaged in the first projecting guide portions 22a, 22a, and the case body 10 through the concave fit portions 10a, 10a into which the convex fit portions 11b, 11b are fitted, the external load is transmitted from not only the case cover 11 but also the case body 10 to the seat cushion 1a through the collar 23 and the bolts (not shown). Thus, the external load is shared by both the case body 10 and the case cover 11 in a good balance.

As shown in FIG. 1, the collar 23 includes a slit 23a formed in a circumferential position of the collar 23, and cutouts 23b formed in both axial end portions of the collar 23 on a diametrically opposed side of the slit 23a. The slit 23a extends in an axial direction of the collar 23 over an entire length of the collar 23. On the other hand, as shown in FIG. 3A, FIG. 3B and FIG. 3D, a first positioning projection 11f is formed on the side of an axial end (i.e., on the front end side) of an inner periphery of each of the mount holes 11e of the case cover 11. The first positioning projection 11f on the inner periphery of each of the mount holes 11e is located on a radially inner side of the case cover 11. The first positioning projection 11f extends from the inner periphery of each of the mount holes 11e in a radially inward direction of each of the mount holes 11e. The first positioning projection 11f is engaged in the slit 23a of the collar 23 to thereby carry out positioning of the collar 23 in a circumferential direction thereof. Further, as shown in FIG. 3A, FIG. 3BC and FIG. 3E, a second positioning projection 10f is formed on the side of an axial end (i.e., on the rear end side) of an inner periphery of each of the mount holes 10e of the case body 10. The second positioning projection 10f on the inner periphery of each of the mount holes 10e is located on a radially outer side of the case body 10. The second positioning projection 10f extends from the inner periphery of each of the mount holes 10e in a radially inward direction of each of the mount holes 10e. The second positioning projection 10f is engaged in one of the cutouts 23b of the collar 23 to thereby carry out positioning of the collar 23 in an axial direction thereof. After the case body 10 and the case cover 11 are assembled to each other, the collar 23 is inserted into each of the mount holes 11e of the case cover 11 and each of the mount holes 10e of the case body 10 until the second positioning projection 10f is engaged in one of the cutouts 23b in such a state that the first positioning projections 11f are engaged in the slit 23a.

In FIG. 1, reference numeral 24 denotes a screw used for provisionally assembling the case body 10 and the case cover 11 to each other, and reference numeral 26 denotes an O-ring. As shown in FIG. 1, the case cover 11 has a concave positioning portion 11g on an outer periphery thereof along the circumferential direction there. The concave positioning portion 11g is located to make an angle of 90 degrees with respect to each of the convex fit portions 11b, 11b. The case body 10 has a convex positioning portion 10g on an outer periphery thereof along the circumferential direction thereof. The convex positioning portion 10g is fitted into the concave positioning portion 11g. The convex positioning portion 10g and the concave positioning portion 11g cooperate with each other to carry out relative positioning of the case body 10 and the case cover 11 in opposite directions in a plane perpendicular to the central axis of the output shaft 12.

[Function]

A basic function of the geared motor 9 will be explained hereinafter. When the electric motor 14 is rotated to thereby rotate the worm 15, the worm gear 18 meshing with the worm 15 is rotated about the output shaft 12. Then, the eccentric shaft portion 19a formed integrally with the worm gear 18 is rotated, and the external gear 20 rotatably supported on the eccentric shaft portion 19a is turned around the central axis of the output shaft 12 without rotating about the central axis of the external gear 20. The intermeshing portion between the external gear 20 and the internal gear 21 is moved in the circumferential direction to make one rotation. The internal gear 21 having the number of teeth larger than that of the external gear 20 by one or two is rotated in the same direction by one or two teeth, thereby serving to reduce the rotational speed of the external gear 20. The rotation of the internal gear 21 is outputted as the rotation of the output shaft 12 and the pinion 25. As a result, the seat 1 as shown in FIG. 7 is upward or downward moved.

In the geared motor 9 according to this embodiment, when an external load is reversely inputted through the output shaft 12, the external load is transmitted from the geared plate 20a with the integral external gear 20 to the guide plate 22, and then transmitted from the first projecting guide portions 22a, 22a to the convex fit portions 11b, 11b through the first recessed guide portions 11a, 11a. The external load is then transmitted from the convex fit portions 11b, 11b to the concave fit portions 10a, 10a. As a result, the external load is shared by the case cover 11 and the case body 10, and is transmitted to a seat cushion-side arm (not shown) of the seat cushion 1a through the collars 23 and bolts (not shown).

In the geared motor 9 according to this embodiment, since the external load reversely inputted through the output shaft 12 is shared by the case cover 11 and the case body 10, and is separately transmitted to the seat cushion-side arm of the seat cushion 1a through the collars 23 and the bolts (not shown), the case cover 11 and the case body 10 can ensure the strength even though both the case cover 11 and the case body 10 are made of resin. Therefore, it is not necessary to use as the guide plate 22, a steel plate directly fixed to the seat cushion-side arm as described in the conventional art. Accordingly, the number of parts can be reduced, so that the geared motor 9 can serve to reduce the weight and the cost.

Further, in the geared motor 9 according to this embodiment, when the external load is reversely inputted through the output shaft 12, the external load is transmitted from the first projecting guide portions 22a, 22a of the guide plate 22 to the fitting portions at which the convex fit portions 11b, 11b and the concave fit portions 10a, 10a are fitted to each other, through the first recessed guide portions 11a, 11a. The external load is then transmitted to the seat cushion-side arm of the seat cushion 1a through the bolts (not shown) and the collars 23 which are located adjacent to the fitting portions on the advance side of the fitting portions in the predetermined direction (i.e., in a predetermined circumferential direction of the case cover 11 and the case body 10). That is, the bolts and the collars 23 are located in the angular positions offset relative to the fitting portions by the angle α in the clockwise direction as shown in FIG. 6B.

Further, in the geared motor 9 according to this embodiment, the external load reversely inputted through the output shaft 12 is transmitted to the fitting portions of the case cover 11 and the case body 10, and is then transmitted to the seat cushion-side arm of the seat cushion 1a through the bolts (not shown) and the collars 23 which are disposed adjacent to the fitting portions on the advance side of the fitting portions in the predetermined circumferential direction of the case cover 11 and the case body 10. Therefore, a less amount of the external load is transmitted to the remaining portion of the case cover 11 and the case body 10 except for the portions thereof that are located between the fitting portions and the diametrically opposed mount holes 11e, 11e and 10e, 10e. Accordingly, it is possible to ensure the strength of the case body 10 and the case cover 11.

Further, in the geared motor 9 according to this embodiment, the collars 23 are clearance-fitted into the mount holes 11e, 11e of the case cover 11. With this construction, when the external load is reversely inputted through the output shaft 12, the external load is transmitted to the convex fit portions 11b, 11b of the case cover 11 through the first projecting guide portions 22a, 22a of the guide plate 22 and the first recessed guide portions 11a, 11a. Then, the external load is transmitted from the convex fit portions 11b, 11b to both the case body 10 and the case cover 11 through the concave fit portions 10a, 10a of the case body 10 in an initial stage. Then, the external load is transmitted from both the case body 10 and the case cover 11 to the seat cushion-side arm of the seat cushion 1a through the collars 23 and the bolts (not shown). Thus, the external load can be shared by the case body 10 and the case cover 11 in a good balance and transmitted to the seat cushion-side arm.

Furthermore, in the geared motor 9 according to this embodiment, the collars 23 are clearance-fitted into the mount holes 11e of the case cover 11 having the convex fit portions 11b, 11b to which the external load reversely inputted is transmitted. With this construction, in an initial stage, the external load reversely inputted is transmitted to the convex fit portions 11b, 11b and the concave fit portions 10a, 10a through the first projecting guide portions 22a, 22a of the guide plate 22 and the first recessed guide portions 11a, 11a. Therefore, the external load can be surely transmitted to the seat cushion-side arm of the seat cushion 1a through both the case body 10 and the case cover 11. That is, the external load is shared by the case body 10 and the case cover 11 in good balance, and then transmitted to the seat cushion-side arm. The external load can be transmitted without concentrating on one of the case body 10 and the case cover 11. Accordingly, the geared motor 9 can serve to enhance a strength of the case.

Figure 2:
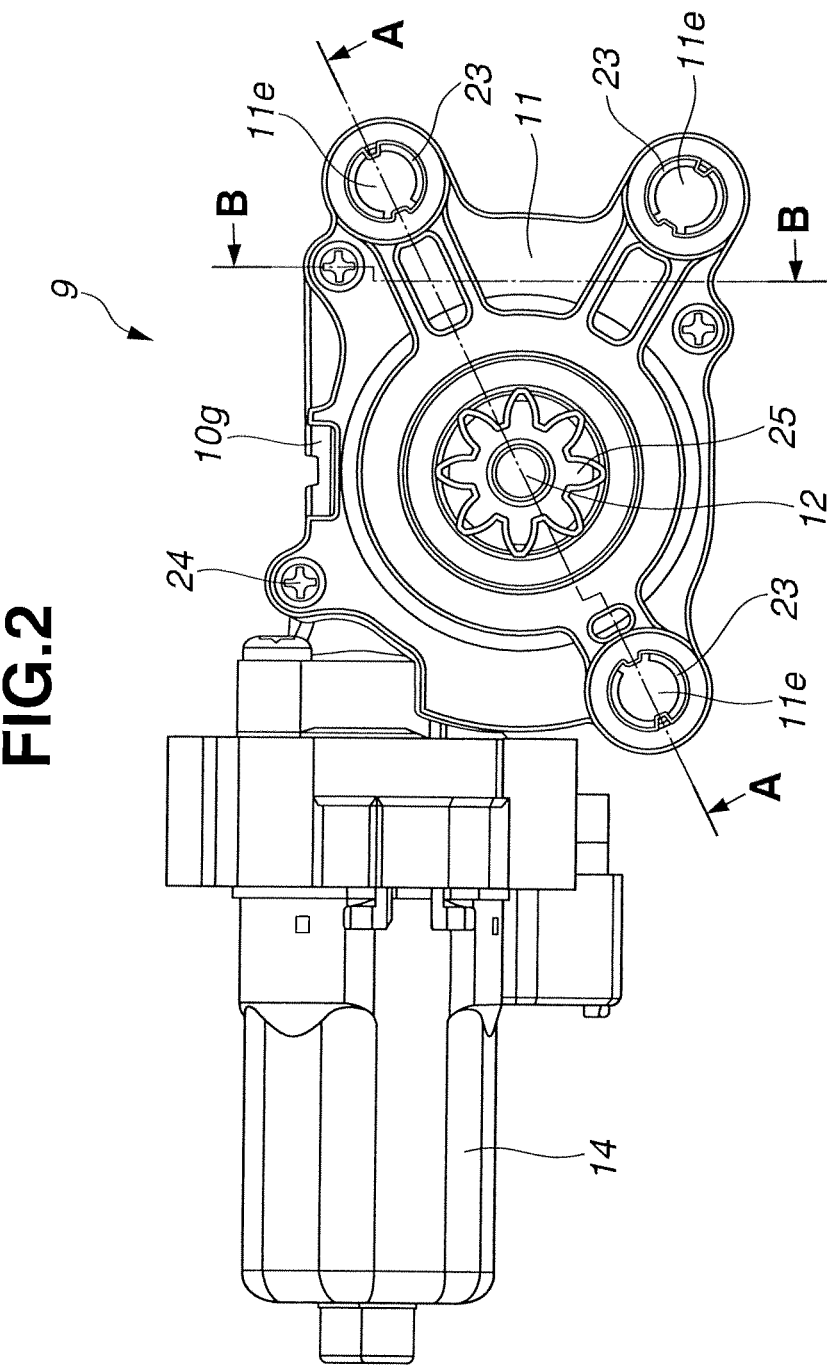
FIG. 2 is a front view of the geared motor according to the embodiment of the present invention.

The present invention is not limited to the above embodiment in which the geared motor is used as a driving source for a seat lifter. In addition, a pair of first recessed guide portions in which the first projecting guide portions 22a, 22a of the guide plate 22 is engaged, and a pair of convex fit portions surrounding the first recessed guide portions can be formed in the case body 10. A pair of concave fit portions into which the pair of convex fit portions are fitted can be formed in the case cover 11. In such a case, the collars 23 are press-fitted into the mount holes 11e, 11e of the case cover 11. Further, in the above embodiment, the mount holes 10e, 11e are formed adjacent to the fitting portions of the case body 10 and the case cover 11 on the advance side of the fitting portions thereof in the predetermined direction in which the guide plate 22 is rotated when an external load is applied to the fitting portions in the circumferential direction of the case body 10 and the case cover 11. Meanwhile, in FIG. 7, when a passenger is pressed onto the seat back 1b upon occurrence of vehicle collision, the seat cushion 1a is moved in the rearward direction of the vehicle so that the link 5 is rotated relative to the seat cushion 1a in the counterclockwise direction and a load is exerted on the pinion 9a so as to rotate in the clockwise direction. Therefore, the mount holes 10e, 11e are formed on the advance side of the fitting portions in the clockwise direction. In contrast, FIG. 1 and FIG. 2 show the geared motor 9 when viewed from the side opposite to FIG. 7. Accordingly, in FIG. 1 and FIG. 2, the predetermined direction in which the guide plate 22 is rotated is the counterclockwise direction, and the mount holes 10e, 11e are formed offset relative to the fitting portions in the counterclockwise direction.

This application is based on a prior Japanese Patent Application No. 2011-239136 filed on Oct. 31, 2011. The entire contents of the Japanese Patent Application No. 2011-239136 are hereby incorporated by reference.

Although the invention has been described above by reference to a certain embodiment of the invention and modifications of the embodiments, the invention is not limited to the embodiment and modifications described above. Further variations of the embodiment and modifications described above will occur to those skilled in the art in light of the above teachings. The scope of the invention is defined with reference to the following claims.

What is claimed is:

1. A geared motor comprising:
    a case body made of a resin material, the case body having a first cylindrical bore that extends through the case body,
    a case cover made of a resin material, the case cover having a second cylindrical bore that extends through the case cover, the case cover cooperating with the case body to form a case,
    an output shaft rotatably supported by the case body and the case cover through the first and second cylindrical bores, the output shaft having at least one axial end portion outwardly projecting from the case,
    an electric motor mounted to the case body,
    a worm connected to the electric motor,
    a worm gear meshing with the worm and rotatably supported on a side of an other axial end portion of the output shaft,
    an eccentric shaft portion having a central axis eccentric with respect to a central axis of the output shaft, the eccentric shaft portion being formed integrally with the worm gear,
    a geared plate having an external gear rotatably supported on the eccentric shaft portion, the external gear being disposed coaxially with the eccentric shaft and formed integrally with the geared plate,
    an internal gear formed integrally with the output shaft and meshing with the external gear, the internal gear having a greater number of teeth than that of the external gear,
    a generally disk-shaped guide plate disposed between the geared plate and the worm gear, the guide plate guiding the geared plate such that a central axis of the geared plate is allowed to turn around the central axis of the output shaft and the geared plate is prevented from rotating about the central axis of the geared plate,
    a pair of first recessed guide portions formed on a surface of one of the case body and the case cover which is opposed to a surface of an other of the case body and the case cover, the pair of first recessed guide portions being diametrically opposed to each other with respect to the cylindrical bore of the one of the case body and the case cover, the pair of first recessed guide portions serving to guide the guide plate so as to be slidable relative to the pair of first recessed guide portions in a radial direction of the output shaft,
    a pair of first projecting guide portions formed on the guide plate, the pair of first projecting guide portions being slidably engaged in the pair of first recessed guide portions,
    a pair of second recessed guide portions formed on the guide plate along a radial direction of the guide plate, the pair of second recessed guide portions being located offset relative to the pair of first projecting guide portions in a circumferential direction of the guide plate by an angle of 90 degrees,
    a pair of second projecting guide portions formed on the geared plate, the pair of second projecting guide portions being slidably engaged in the pair of second recessed guide portions,
    a pair of convex fit portions formed on the surface of the one of the case body and the case cover, the pair of convex fit portions being diametrically opposed to each other with respect to the cylindrical bore of the one of the case body and the case cover, the pair of convex fit portions extending along a radial direction of the cylindrical bore of the one of the case body and the case cover,
    each of the pair of first recessed guide portions being a recessed portion located in a central position of each of the pair of convex fit portions in a circumferential direction of the one of the case body and the case cover,
    a pair of concave fit portions formed on the surface of the other of the case body and the case cover, the pair of concave fit portions being fitted to the pair of convex fit portions,
    each of the case body and the case cover being formed with at least three mount holes for receiving bolts to couple the case to a member to which the geared motor is mounted, the mount holes of the case body and the mount holes of the case cover being located around the first and second cylindrical bores, respectively, in axial alignment with each other, and
    generally cylindrical collars inserted into and extending over the mount holes of the case body and the mount holes of the case cover which are axially aligned with each other.

2. The geared motor as claimed in claim 1, wherein at least one pair of the mount holes of the case body and the case cover which are axially aligned with each other, are located adjacent to a fitting portion at which one of the pair of the concave fit portions and one of the pair of the convex fit portions are fitted to each other, on an advance side of the fitting portion in a predetermined direction in which the guide plate is rotated when an external load is exerted on the guide plate through the output shaft, the internal gear and the external gear.

3. The geared motor as claimed in claim 1, wherein each of the collars is clearance-fitted into each of the mount holes of the one of the case body and the case cover which is formed with the pair of convex fit portions, on a side of one axial end thereof, and each of the collars is press-fitted to each of the mount holes of the other of the case body and the case cover on a side of the other axial end thereof.

4. The geared motor as claimed in claim 1, wherein each of the pair of first recessed guide portions has grooves on a bottom surface of the first recessed guide portion, the bottom surface being contacted with each of the pair of first projecting guide portions of the guide plate.

5. The geared motor as claimed in claim 1, wherein each of the pair of concave fit portions comprises a projection engaged in each of the pair of first recessed guide portions, the projection being formed in a central position of a bottom surface of each of the pair of concave fit portions.

* * * * *